(12) United States Patent (10) Patent No.: US 12,657,653 B2
Itani et al. (45) Date of Patent: Jun. 16, 2026

(54) IMAGE ANALYSIS DEVICE, IMAGE ANALYSIS METHOD, AND STORAGE MEDIUM STORING IMAGE ANALYSIS PROGRAM

(71) Applicant: Mitsubishi Electric Corporation, Tokyo (JP)

(72) Inventors: Yusuke Itani, Tokyo (JP); Saki Ito, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 214 days.

(21) Appl. No.: 18/385,747

(22) Filed: Oct. 31, 2023

(65) Prior Publication Data

US 2024/0062329 A1 Feb. 22, 2024

Related U.S. Application Data

(63) Continuation of application No. PCT/JP2021/017798, filed on May 11, 2021.

(51) Int. Cl.
*G06T 3/40* (2024.01)

(52) U.S. Cl.
CPC ..................................... *G06T 3/40* (2013.01)

(58) Field of Classification Search
CPC ........ G06T 3/40; G06V 30/10; G06V 30/147; G06V 30/413
USPC ......................................................... 382/298
See application file for complete search history.

(56) References Cited

U.S. PATENT DOCUMENTS

2010/0046840 A1* 2/2010 Hashiguchi .......... G06V 10/987
382/203
2013/0259383 A1* 10/2013 Kondo ................. G06V 30/148
382/199
2020/0311440 A1* 10/2020 Bamba ................... G06V 10/50
2024/0394863 A1* 11/2024 Kashima .............. G06T 7/0002

FOREIGN PATENT DOCUMENTS

JP        2019-40260 A      3/2019

OTHER PUBLICATIONS

Indian Office Action for Indian Application No. 202347074657, dated Apr. 15, 2025, with English translation.
Hirano et al., "Line Extraction Method from Document Images", General Conference, Mar. 1998, The Institute of Electronics, Information and Communication Engineers, total 4 pages.

(Continued)

*Primary Examiner* — William D Titcomb
(74) *Attorney, Agent, or Firm* — Birch, Stewart, Kolasch & Birch, LLP

(57) ABSTRACT

An image analysis device includes: an acquisition unit to acquire an input image; a detection unit to analyse the input image acquired by the acquisition unit and to detect an area corresponding to a component image constituting the input image and a type of the component image; an expansion unit to expand the area detected by the detection unit; an evaluation unit to evaluate an image included in the area expanded by the expansion unit on the basis of a rule according to the type; and an output unit to output the area corresponding to the component image from the area expanded by the expansion unit on the basis of an evaluation result given by the evaluation unit.

9 Claims, 11 Drawing Sheets

(56)  References Cited

OTHER PUBLICATIONS

International Search Report for PCT/JP2021/017798 mailed on Jul. 27, 2021.

Itani et al., "Text Line Extraction Method Using Domain-based Active Contour Model", ICDAR 2013, Aug. 2013, pp. 1230-1234.

Extended European Search Report for European Application No. 21941830.8, dated Apr. 23, 2024.

Chinese Office Action for Chinese Application No. 202180097770.0, dated Oct. 9, 2025, with English translation.

European Communication pursuant to Article 94(3) EPC for European Application No. 21 941 830.8, dated Jan. 20, 2026.

Chinese Office Action issued in Chinese Application No. 202180097770.0 on Apr. 3, 2026, with English translation.

* cited by examiner

FIG. 10

| Candidate type | Score |
|---|---|
| Table | 0.8 |
| Figure | 0.7 |
| Text | 0.2 |
| ⋮ | |

IMAGE ANALYSIS DEVICE, IMAGE ANALYSIS METHOD, AND STORAGE MEDIUM STORING IMAGE ANALYSIS PROGRAM

CROSS REFERENCE TO RELATED APPLICATION

This application is a Continuation of PCT International Application No. PCT/JP2021/017798, filed on May 11, 2021, which is hereby expressly incorporated by reference into the present application.

TECHNICAL FIELD

The present disclosure relates to an image analysis device, an image analysis method, and an image analysis program.

BACKGROUND ART

Technologies for analysing an input image captured by a scanner, etc. to detect areas corresponding to component images that constitute the input image have been conventionally known. According to Patent Document 1, it is possible to detect an area corresponding to a component image of each of elements, such as a figure, a table, or a text, which constitute an input image.

Prior Art Documents

Patent Document

[Patent Document 1] Japanese Unexamined Patent Application Publication No. 2019-40260

SUMMARY OF THE INVENTION

Problems to be Solved by the Invention

Meanwhile, however, a misalignment may occur between the area corresponding to a component image constituting an input image and the detected area. In such cases, the conventional technologies unfortunately cannot output the area corresponding to the component image accurately.

The aim of the present disclosure is to solve the aforementioned problem and thus to control the degradation of output accuracy of an area corresponding to a component image even when a misalignment occurs between the area corresponding to the component image constituting an input image and the detected area.

Means for Solving Problem

An image analysis device includes: an acquisition unit to acquire an input image; a detection unit to analyse the input image acquired by the acquisition unit and to detect an area corresponding to a component image constituting the input image and a type of the component image; an expansion unit to expand the area detected by the detection unit; an evaluation unit to evaluate an image included in the area expanded by the expansion unit on the basis of a rule according to the type; and an output unit to output an area corresponding to the component image from the area expanded by the expansion unit on the basis of an evaluation result given by the evaluation unit.

Effects of the Invention

According to the present disclosure, the degradation of output accuracy of an area corresponding to a component image can be controlled even when a misalignment occurs between the area corresponding to the component image constituting an input image and the detected area.

BRIEF DESCRIPTION OF THE DRAWINGS

FIG. 10 shows scores calculated for each of candidate types.

EMBODIMENTS FOR CARRYING OUT THE INVENTION

Embodiment 1

Figure 1:
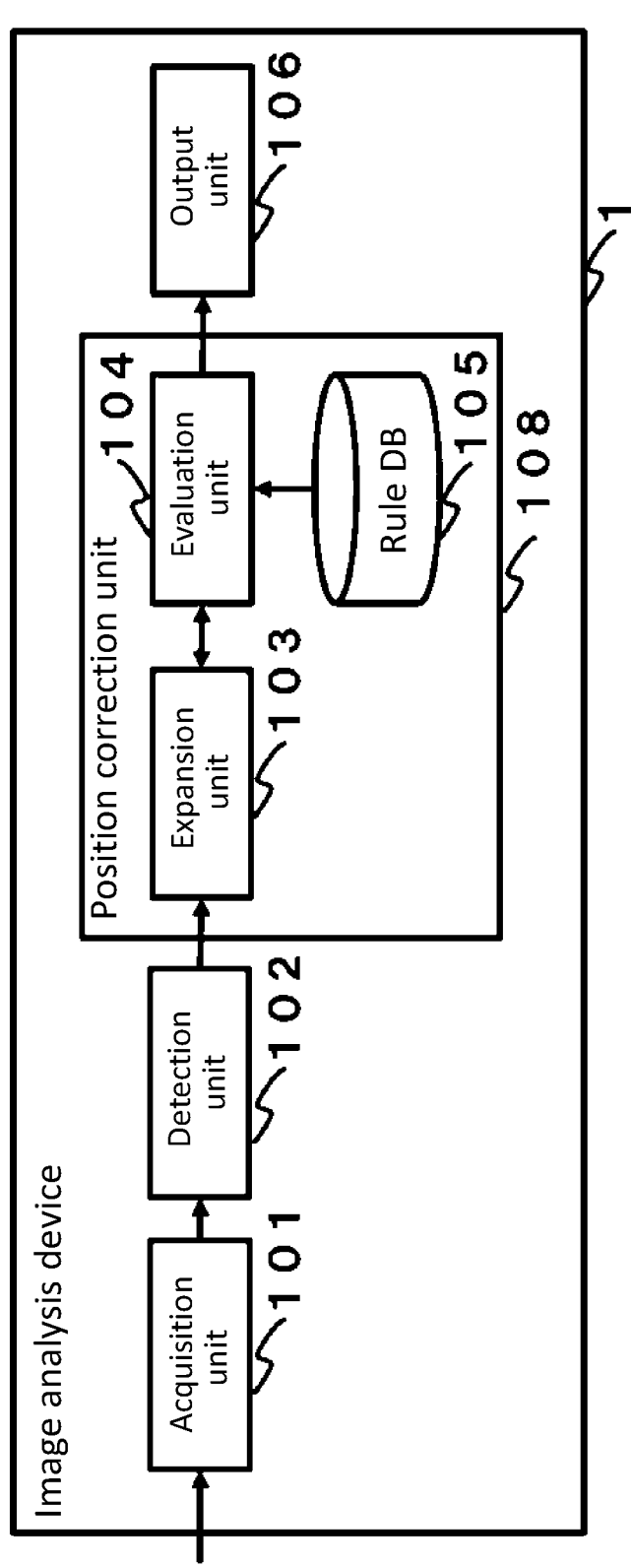
FIG. 1 is a block diagram showing a configuration of an image analysis device 1 according to Embodiment 1.

FIG. 1 is a block diagram showing a configuration of an image analysis device 1 according to Embodiment 1. The image analysis device 1 is a device that analyses an acquired input image and outputs areas each corresponding to a component image constituting the input image. The input image includes component images, which are represented by types such as figure, table, and text. The image analysis device 1 includes an acquisition unit 101, a detection unit 102, a position correction unit 108, and an output unit 106.

The acquisition unit 101 acquires an input image read by a device such as a scanner or a camera, which is not shown in the figure. The detection unit 102 analyses the input image acquired by the acquisition unit 101 and detects areas and their types each corresponding to a component image constituting the input image. In the following description, an area that is detected by the detection unit 102 and corresponds to a component image constituting the input image is referred to as a detection area. It is assumed here that some of the detection areas detected by the detection unit 102 may not exactly match the component images constituting the input image and may include misalignment and that an image included in the detection area is stored in a memory or a storage unit.

An expansion unit 103 expands the detection area detected by the detection unit 102 at least twice and until an exit condition of the expansion is satisfied. The expansion unit 103 expands the detection area, for example, by a predetermined width, height, area, or magnification rate. Hereafter, the area expanded by the expansion unit 103 will be referred to as an expansion area. An image included in the expansion area shall be stored in a memory or a storage unit. Note that the detection area detected by the detection unit 102 may be considered as the 0th expansion area expanded by the expansion unit 103.

Next, exit conditions of the expansion by the expansion unit 103 are described. One of the exit conditions of the extension is that the expansion area includes an area of a different type from the type of the detection area. Another one of the exit conditions of the expansion is that the number of the expansions of the detection area reaches a maximum limit. Yet another one of the exit conditions of the expansion is that the expansion area encloses the outline of the component image. Here, the outline of the component image may be a solid line of an outer frame surrounding each element such as a figure, a table, or a text, or may be a virtual line of a rectangular bounding each element. The case where the expansion area encloses the outline of the component image includes, by definition, the case where the detection area is expanded such that the outer frame of the expansion area is of an equal distance from the outline of the component image. To detect the outline, for example, a method described in Reference 1 can be applied. Alternatively, more than one of the above exit conditions may be combined into one exit condition. The exit conditions of the expansion are stored, for example, in a storage unit 13 described below. Reference 1: Takashi Hirano, Yasuhiro Okada, Fumio Yoda, "Line Extraction Method from Document Images", General Conference, March 1998, The Institute of Electronics, Information and Communication Engineers An evaluation unit 104 evaluates an image included in the area expanded by the expansion unit 103 on the basis of a rule according to the type of the area concerned. More specifically, the evaluation unit 104 evaluates an image included in the area obtained as a result of the Nth expansion by the expansion unit 103 and an image included in the area obtained as a result of the N+1th expansion by the expansion unit 103 on the basis of a rule according to the type of the area concerned. A rule DB 105 stores a rule for evaluating the image included in an area expanded by the expansion unit 103. The rule DB 105 may be included in the image analysis device 100 or provided externally.

The output unit 106 outputs an image included in the area expanded by the expansion unit 103 as an image corresponding to the component image on the basis of the evaluation result (evaluation value) given by the evaluation unit 104. More specifically, the output unit 106 outputs an image, included in the expanded area, whose evaluation value given by the evaluation unit 104 is the largest as an image corresponding to the component image.

Figure 2:
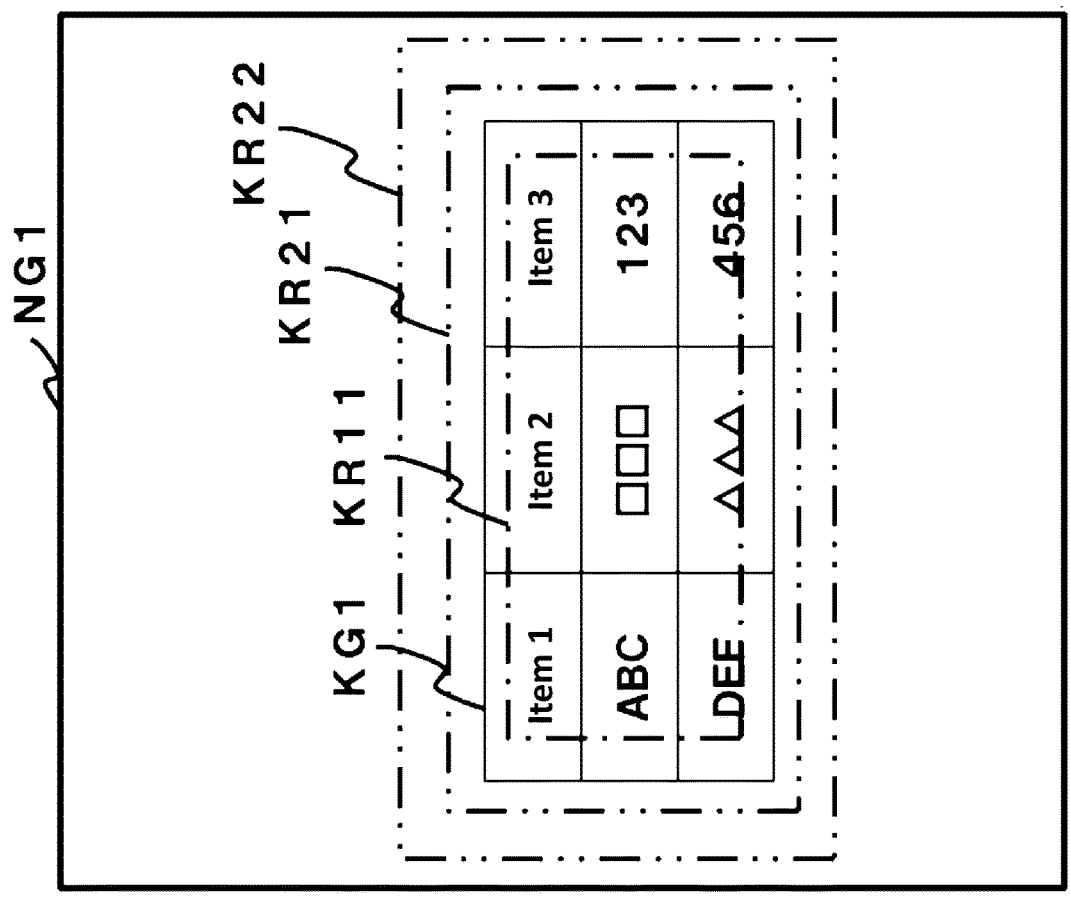
FIG. 2 illustrates a component image that constitutes an input image, a detection area corresponding to the component image, and an expansion area that is an expansion of the detection area.

FIG. 2 illustrates a component image that constitutes an input image, a detection area corresponding to the component image, and an expansion area that is an expansion of the detection area. An input image NG1 includes a component image KG1 containing a table, for example. The detection area KR11 indicated by the alternate long and short dash line shows an area detected by the detection unit 102.

It is assumed here that detection area KR11 may not exactly match the component image KG1 and may include misalignment. An expansion area KR21 indicated by an alternate long and two short dashes line shows an area obtained as a result of the expansion of the detection area KR11 by the expansion unit 103. An expansion area KR22 indicated by the other alternate long and two short dashes line shows an area obtained as a result of the expansion of the expansion area KR21 by the expansion unit 103.

Table 1 is an example of the rule for evaluating the image included in the area expanded by the expansion unit 103, the rule being stored in the rule DB 105.

TABLE 1

| Type | Rule |
|---|---|
| Table | The smaller the difference between the number of cells in the area before the expansion and the number of cells in the area after the expansion is, the higher evaluation value is given to the area before the expansion. |
| Text | The higher the degree of coincidence between the character recognition result for the image included in the area before the expansion and the character recognition result for the image included in the area after the expansion is, the higher evaluation value is given to the area before the expansion. |
| Figure | The larger the blank area contained in the image included in the expansion area is, the higher evaluation value is given. |

Figure 3:
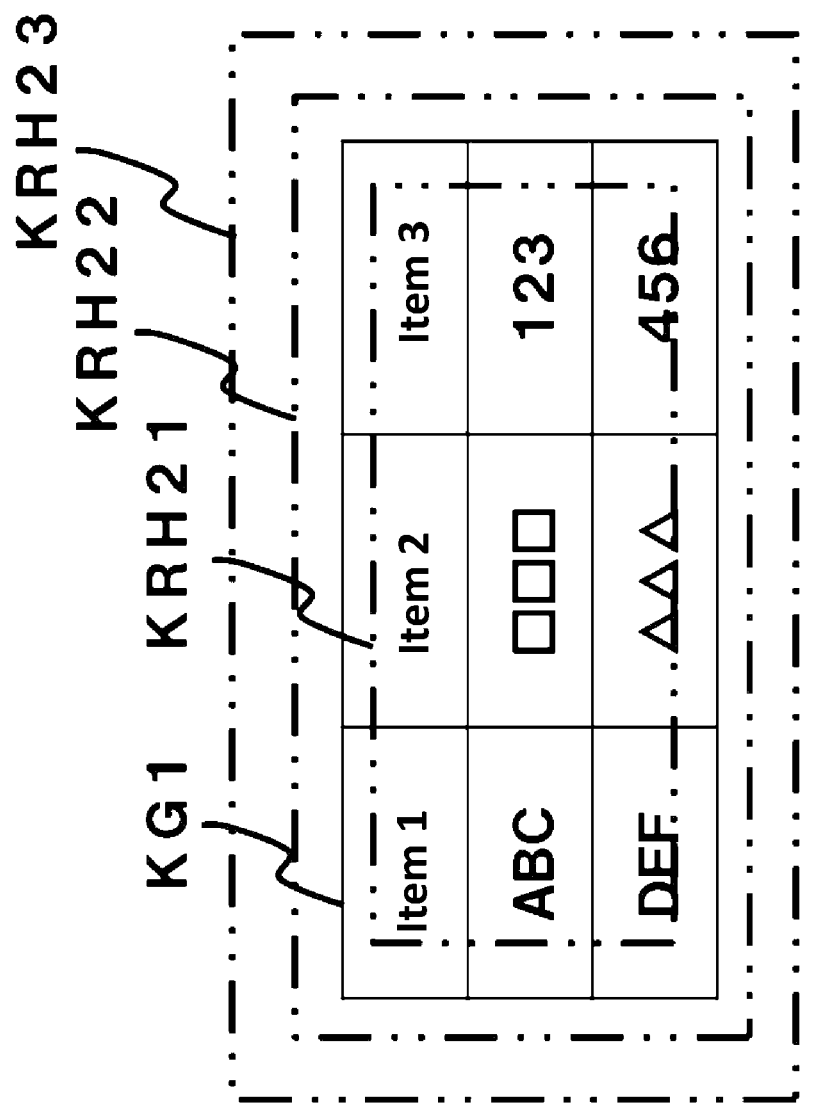
FIG. 3 illustrates a rule for evaluating a table.

FIG. 3 illustrates the rule for evaluating a table included in the detection area. It is assumed here that the detection unit 102 has detected "a table" as the type corresponding to the component image KG1. An expansion area KRH21 is an area obtained as a result of the N−1th expansion of the detection area detected by the detection unit 102 and includes one cell therein. An expansion area KRH22 is an area obtained as a result of the Nth expansion of the detection area detected by the detection unit 102 and includes nine cells therein. An expansion area KRH23 is an area obtained as a result of the N+1th expansion of the detection area detected by the detection unit 102 and includes nine cells therein. The evaluation unit 104 gives a higher evaluation value to the area before the expansion as the difference between the number of cells in the area before the expansion and the number of cells in the area after the expansion is smaller. More specifically, the type detected here by the detection unit 102 is a table; and the difference (zero) between the number (nine) of cells included in the area obtained as a result of the Nth expansion by the expansion unit 103 and the number (nine) of cells included in the area obtained as a result of the N+1th expansion by the expansion unit 103 is smaller than the difference (eight) between the number (one) of cells included in the area obtained as a result of the N−1th expansion by the expansion unit 103 and the number (nine) of cells included in the area obtained as a result of the Nth expansion by the expansion unit 103. Therefore, the evaluation unit 104 gives a higher evaluation value to the area obtained as a result of the Nth expansion. To extract the cells, for example, a method described in Reference 2 can be applied.
Reference 2: Y. Itani et. al, "Text Line Extraction Method Using Domain-based Active Contour Model", ICDAR 2013, August 2013

Figure 4:
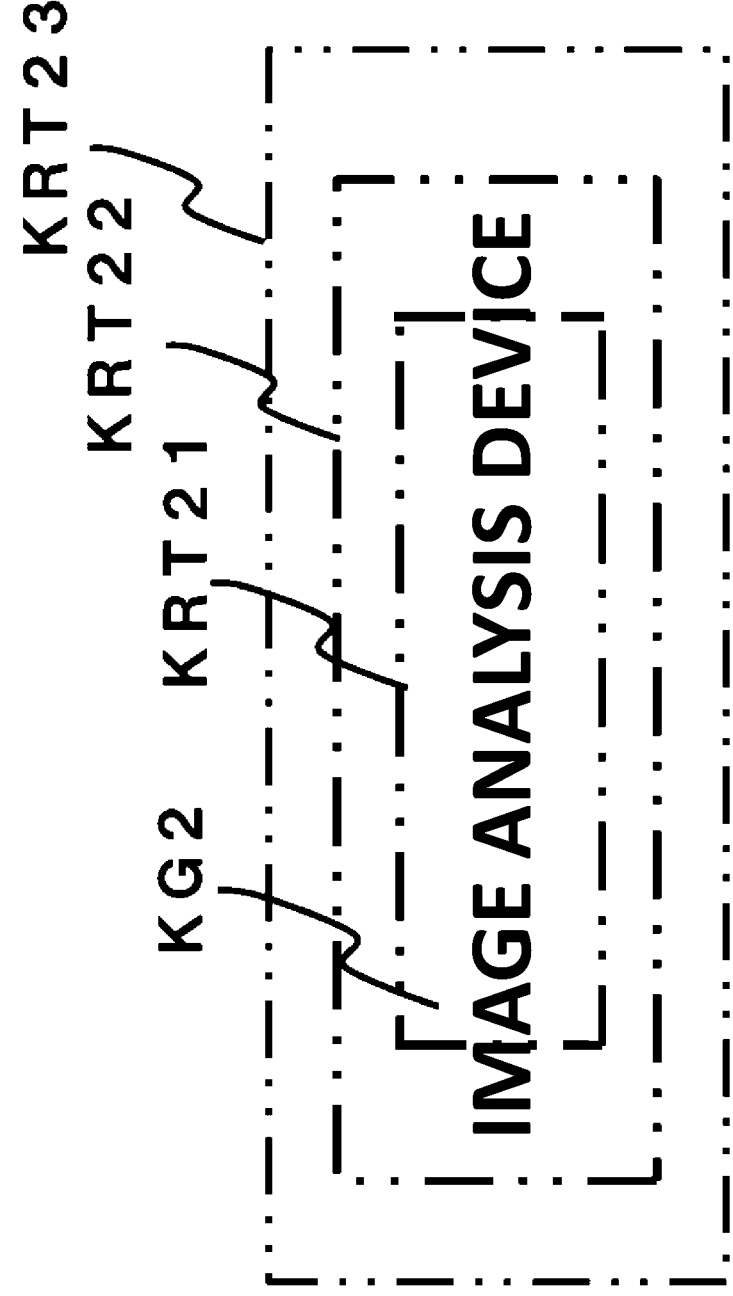
FIG. 4 illustrates a rule for evaluating a text.

FIG. 4 illustrates a rule for evaluating a text included in the detection area. It is assumed here that the detection unit 102 has detected "a text" as the type corresponding to a component image KG2. An expansion area KRT21 is an area obtained as a result of the N−1th expansion of the detection area detected by the detection unit 102 and includes a string of "AGE ANALYSIS DEV" as the character recognition result for the image included in the area. An expansion area KRT22 is an area obtained as a result of the Nth expansion of the detection area detected by the detection unit 102 and includes a string of "IMAGE ANALYSIS DEVICE" as the character recognition result for the image included in the area. An expansion area KRT23 is an area obtained as a result of the N+1th expansion of the detection area detected by the detection unit 102 and includes a string of "IMAGE ANALYSIS DEVICE" as the character recognition result for the image included in the area. The evaluation unit 104 gives a higher evaluation value to the area before the expansion as the degree of coincidence between the character recognition result for the image included in the area before the expansion and the character recognition result for the image included in the area after the expansion is higher. More specifically, the type detected here by the detection unit 102 is a text; and the degree of coincidence between the character recognition result "IMAGE ANALYSIS DEVICE" for the image included in the area obtained as a result of the Nth expansion by the expansion unit 103 and the character recognition result "IMAGE ANALYSIS DEVICE" for the image included in the area obtained as a result of the N+1th expansion by the expansion unit 103 is higher than the degree of coincidence between the character recognition result "AGE ANALYSIS DEV" for the image included in the area obtained as a result of the N−1th expansion by the expansion unit 103 and the character recognition result "IMAGE ANALYSIS DEVICE" for the image included in the area obtained as a result of the Nth expansion by the expansion unit 103. Therefore, the evaluation unit 104 gives a higher evaluation value to the area obtained as a result of the Nth expansion. The degree of coincidence between the character recognition results can be calculated on the basis of, for example, the number of coincident characters and/or the percentage of coincident characters between the character recognition result for the image included in the area obtained as a result of the Nth expansion by the expansion unit 103 and the character recognition result for the image included in the area obtained as a result of the N+1th expansion by the expansion unit 103. For the character recognition of an image included in an area, known technologies can be used.

Figure 5:
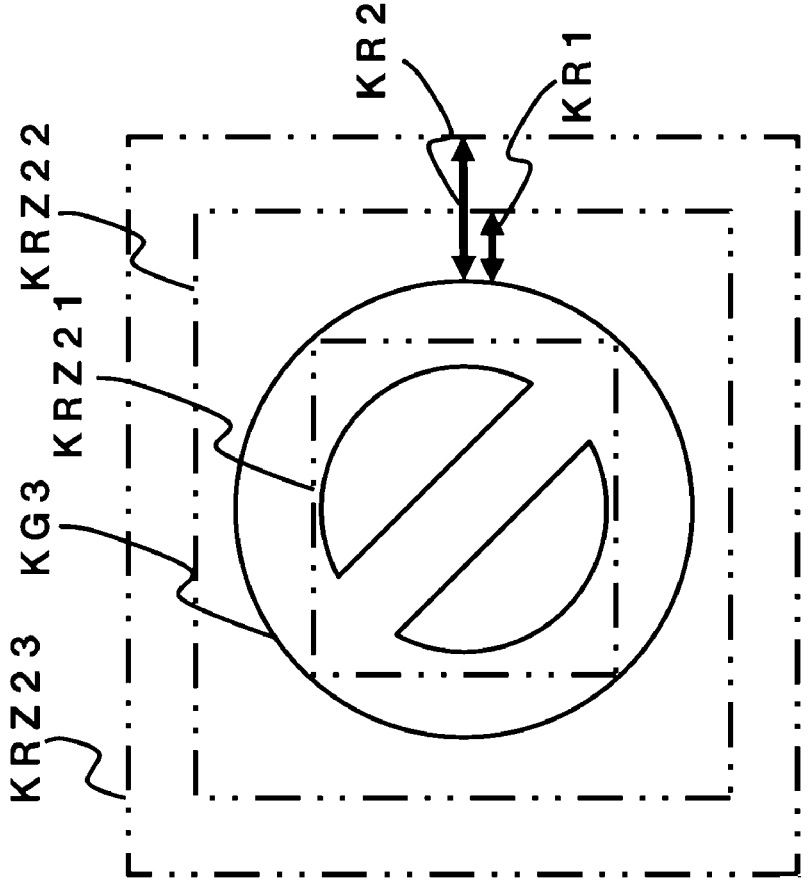
FIG. 5 illustrates a rule for evaluating a figure.

FIG. 5 illustrates a rule for evaluating a figure included in the detection area. It is assumed here that the detection unit 102 has detected "a figure" as the type corresponding to a component image KG3. An expansion area KRZ21 is an area obtained as a result of the N−1th expansion of the detection area detected by the detection unit 102 and includes part of the figure. An expansion area KRZ22 is an area obtained as a result of the Nth expansion of the detection area detected by the detection unit 102 and includes the figure and a blank area KR1. An expansion area KRZ23 is an area obtained as a result of the N+1th expansion of the detection area detected by the detection unit 102 and includes the figure and a blank area KR2. Here, the evaluation unit 104 gives a higher evaluation value as the blank area contained in the image included in the expansion area is larger. More specifically, the type detected here by the detection unit 102 is a figure; and the blank area KR2 included in the area obtained as a result of the N+1th expansion by the expansion unit 103 is larger than the blank area KR1 included in the area obtained as a result of the Nth expansion by the expansion unit 103. Therefore, the evaluation unit 104 gives a higher evaluation value to the area obtained as a result of the N+1th expansion.

That is, the evaluation unit 104 gives a higher evaluation value to the expansion area KRZ23 than to the expansion area KRZ21 and the expansion area KRZ22. Alternatively, as with the case where the type detected by the detection unit 102 indicates a text, the evaluation unit 104 may give a higher evaluation value to the area before the expansion as the degree of coincidence between the image recognition result for the image included in the area before the expansion and the image recognition result for the image included in the area after the expansion is higher. For the image recognition of an image included in an area, known technologies that enable, at least, extraction of image features can be used. The degree of coincidence between the image recognition results can be calculated on the basis of, for example, the number of coincident features and/or the percentage of coincident features between the image recognition result for the image included in the area obtained as a result of the Nth expansion by the expansion unit 103 and the image recognition result for the image included in the area obtained as a result of the N+1th expansion by the expansion unit 103.

Figure 6:
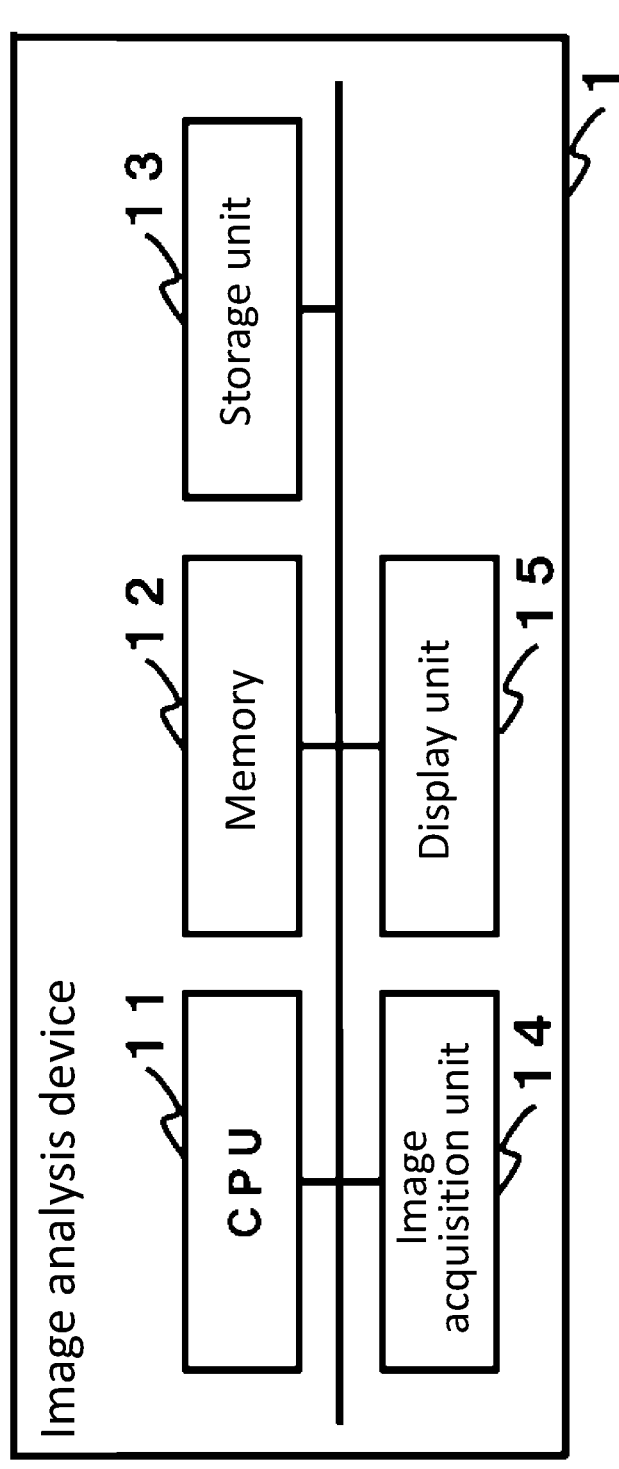
FIG. 6 illustrates an example of a hardware configuration of the image analysis device 1.
Figure 7:
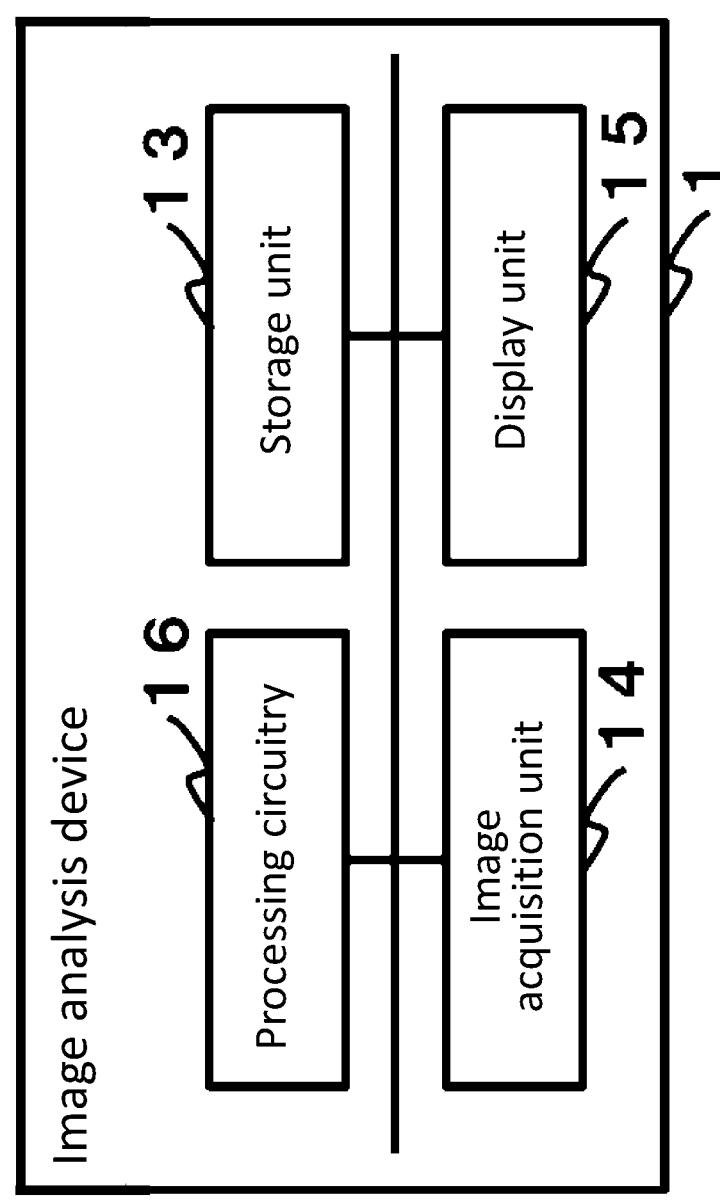
FIG. 7 illustrates an example of a hardware configuration of the image analysis device 1.

FIG. 6 illustrates an example of a hardware configuration of the image analysis device 1. The image analysis device 1 includes a CPU 11, a memory 12, a storage unit 13, an image acquisition unit 14, and a display unit 15. The CPU 11 executes a program, etc. stored in the memory 12 to realize the functions of the acquisition unit 101, the detection unit 102, the position correction unit 108, and the output unit 106 shown in FIG. 1. The memory 12 and the storage unit 13 store various programs to be executed by the CPU 11 and various data to be used for the processing to be executed by the CPU 11. The image acquisition unit 14 is, for example, an interface to acquire an input image inputted to a device such as a scanner or a camera, which is not shown in the figure. The display unit 15 is, for example, an LCD display to display an image outputted from the CPU 11. The display unit 15 may be included in the image analysis device 100 or provided externally. The CPU 11 and the memory 12 may be realized, for example, as hardware such as processing circuitry 16 shown in FIG. 7.

Figure 8:
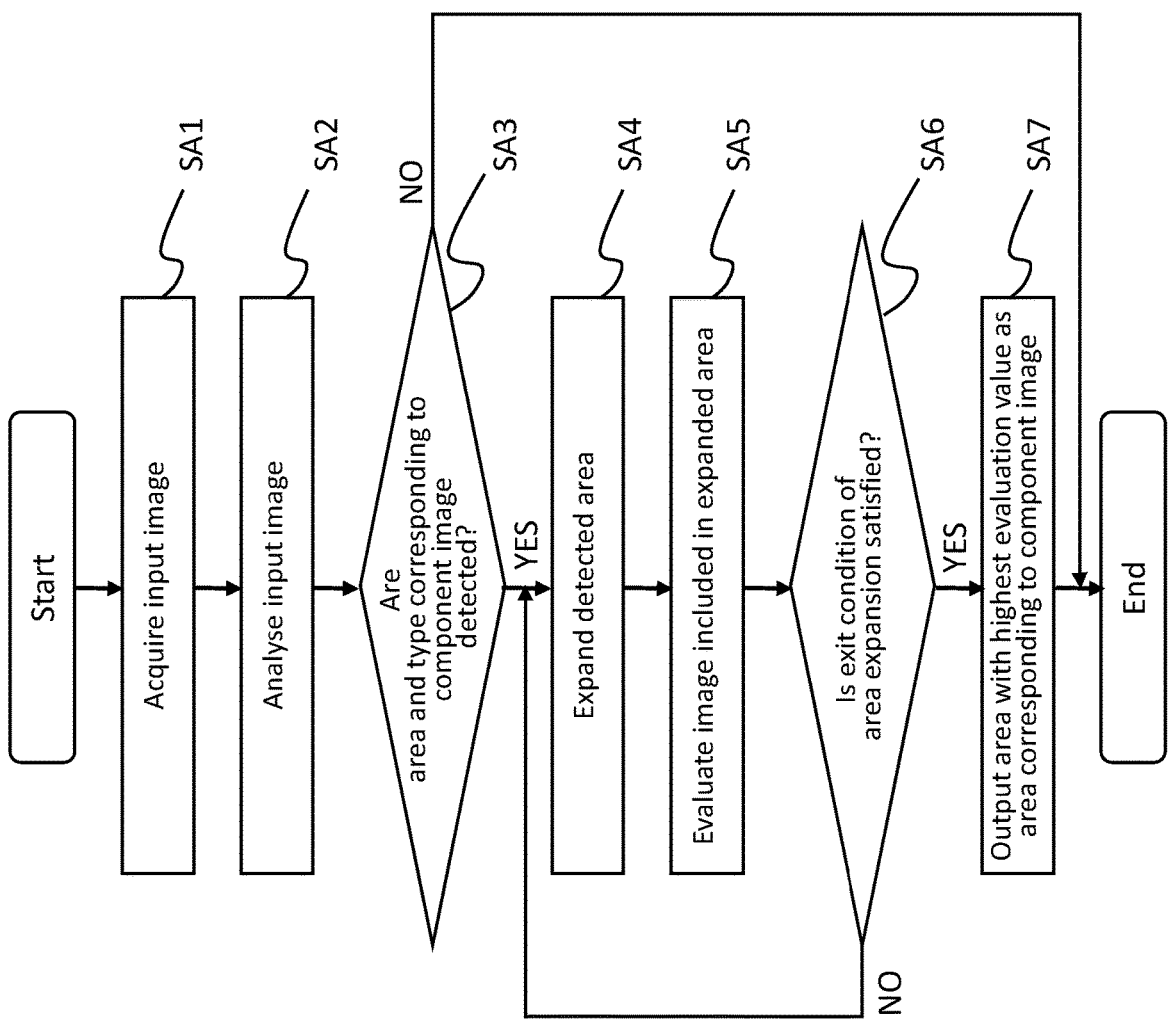
FIG. 8 is a flowchart showing a process of the image analysis device 1.

FIG. 8 is a flowchart showing a process of the image analysis device 1. The acquisition unit 101 acquires an input image read by a device such as a scanner or a camera, which is not shown in the figure (SA1). Next, the detection unit 102 analyses the input image acquired by the acquisition unit 101 (SA2) and detects an area and a type corresponding to a component image constituting the input image (SA3). If no area and type corresponding to a component image constituting the input image is detected (SA3: NO), the image analysis device 1 terminates the image analysis process. If an area and a type corresponding to a component image constituting the input image are detected (SA3: YES), the expansion unit 103 expands the area detected by the detection unit 102 by a predetermined range (expanse, magnification rate, width, height) (SA4). The evaluation unit 104 evaluates the image included in the area expanded by the expansion unit 103 on the basis of the rule according to the type (SA5). If an exit condition of the expansion is satisfied (SA6: YES), the image included in the expansion area with the highest evaluation value given by the evaluation unit 104 is outputted by the output unit 106 as an image corresponding to the component image (SA7). If no exit condition of the expansion is satisfied (SA6: NO), the expansion unit 103 expands the area that was expanded in SA4 again (SA4).

As described above, the image analysis device 1 includes: the acquisition unit 101 to acquire an input image; the detection unit 102 to analyse the input image acquired by the acquisition unit 101 and to detect an area and a type corresponding to a component image constituting the input image; the expansion unit 103 to expand the area detected by the detection unit 102; the evaluation unit 104 to evaluate an image included in the area expanded by the expansion unit 103 on the basis of a rule according to the type; and the output unit 106 to output the image included in the area expanded by the expansion unit 103 as an image corresponding to the component image on the basis of an evaluation result given by the evaluation unit 104. More specifically, the expansion unit 103 expands the detection area detected by the detection unit 102 at least twice and until the exit condition of the expansion is satisfied. The evaluation unit 104 evaluates an image included in the area obtained as a result of the Nth expansion by the expansion unit 103 and an image included in the area obtained as a result of the N+1th expansion by the expansion unit 103 on the basis of a rule according to the type of the area concerned. The output unit 106 outputs an image, included in the expanded area, whose evaluation value given by the evaluation unit 104 is the largest as an image corresponding to the component image. This makes it possible to output, as the image corresponding to the component image, an image included in the area expanded by the expansion unit 103 on the basis of the evaluation results given by the evaluation unit 104 in accordance with the rule according to the type even if a misalignment occurs between the area corresponding to the component image constituting the input image and the detection area detected by the detection unit 102. Thus, the degradation of output accuracy in the area corresponding to the component image can be controlled in accordance with the type of the component image.

Embodiment 2

In Embodiment 1, the expansion unit 103 expanded the detection area uniformly, regardless of the type of the detection area. However, the size of the component image varies depending on the type such as a table, a text, and a figure. Therefore, in the case of uniform expansion of the detection area, the expanded area may sometimes be too large or too small for the component image. Therefore, in Embodiment 2, the expansion unit 103 expands the detection area in a range (expanse, magnification rate, width, height) corresponding to the type of the detection area.

Also, in Embodiment 1, the detection unit 102 analysed the input image and detected the type corresponding to the component image constituting the input image. However, it is difficult to identify one type corresponding to a component image if, for example, a table includes a text and a figure. Therefore, in Embodiment 2, the detection unit 102 first detects a plurality of candidate types corresponding to a component image constituting the input image, and then selects an appropriate candidate type as the type of the detection area corresponding to the component image.

Figure 9:
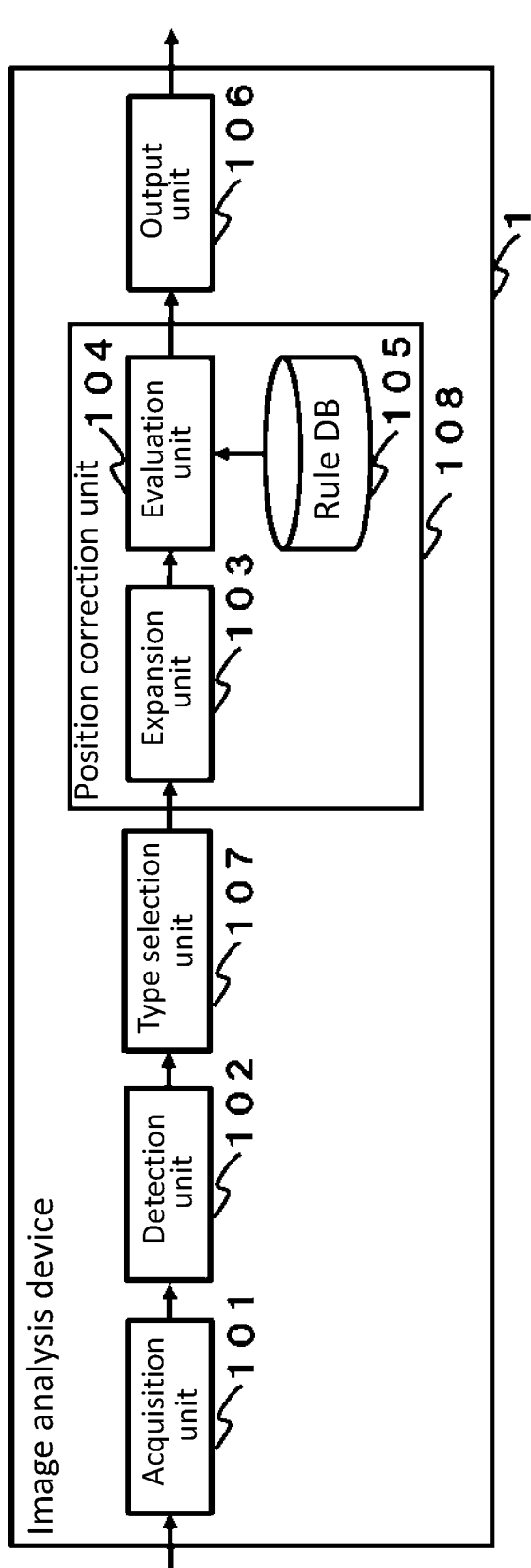
FIG. 9 is a block diagram showing a configuration of an image analysis device 1 according to Embodiment 2.

FIG. 9 is a block diagram showing a configuration of an image analysis device 1 according to Embodiment 2. The image analysis device 1 includes the acquisition unit 101, the detection unit 102, a type selection unit 107, the position correction unit 108, and the output unit 106. Hereinafter, configurations different from those in Embodiment 1 will be described.

The detection unit 102 detects candidates of the type (hereafter, referred to as candidate types) of the detection area corresponding to the component image. The detection unit 102 also calculates scores that indicate the likelihood of the detected candidate types. The score can be calculated on the basis of a result estimated by using a known machine learning algorithm such as neural networks or a cosine similarity to a pre-determined feature vector by using Expression (1). In Expression (1), V shows a feature vector for each predetermined item, and F shows a feature vector obtained from the image during the analysis.

$$\text{Score} = \frac{V * F}{|V||F|} \qquad \text{Expression (1)}$$

The type selection unit 107 selects an appropriate candidate type as the type of the detection area corresponding to the component image from among the candidate types detected by the detection unit 102. A selection method for selecting the appropriate candidate type is, for example, a method using scores. In this case, the type selection unit 107 may select the candidate type for which the score is greater than a threshold value TH1, as in Expression (2). The type selection unit 107 may select, in addition to the candidate type for which the score shows the highest value, a candidate type for which the difference between the score of the candidate type concerned and the score of the highest value is smaller than a threshold value TH2, as in Expression (3). Furthermore, Expression (2) and Expression (3) may be combined; and the type selection unit 107 may select a candidate type that satisfies both of these Expressions simultaneously.

$$\text{detect}_{score} > TH1 \qquad \text{Expression (2)}$$

$$\text{detect}_{score1} - \text{detect}_{score2} < TH2 \qquad \text{Expression (3)}$$

FIG. 10 shows scores calculated for each of the candidate types. FIG. 10 shows the calculated scores for the detection area as follows: the score with an assumption of the candidate type being a table is 0.8; the score with an assumption of the candidate type being a figure is 0.7; and the score with an assumption of the candidate type being a text is 0.2. When it is assumed that the threshold value TH1 in Expression (2) is 0.6 and the threshold value TH2 in Expression (3) is 0.2, the candidate types satisfying Expressions (2) and (3) are the two types, namely a table and a figure. Therefore, the type selection unit 107 selects two of the candidate types, namely a table and a figure, as the candidate types of the detection area corresponding to the component image. The threshold value TH1 and the threshold value TH2 shall be stored in advance in the rule DB 105 or the like.

The expansion unit 103 determines a range (expanse, magnification rate, width, height) to be applied to the expansion of the area detected by the detection unit 102 on the basis of the candidate types selected by the type selection unit 107. The range to be applied to the expansion of the area detected by the detection unit 102 shall be stored in the rule DB 105 or the like in association with the candidate types. The range to be applied to the expansion of the detection area whose candidate type is a table may be set larger than the range to be applied to the expansion of the detection area whose candidate type is a text. Also, the range to be applied to the expansion of the detection area whose candidate type is a figure may be set larger than the range to be applied to the expansion of the detection area whose candidate type is a table. In addition, when a plurality of candidate types is selected, the expansion unit 103 may determine the range (expanse, magnification rate, width, height) to be applied to the expansion of the detection area on the basis of the candidate type with the largest range of the expansion from among the plurality of candidate types selected.

Figure 11:
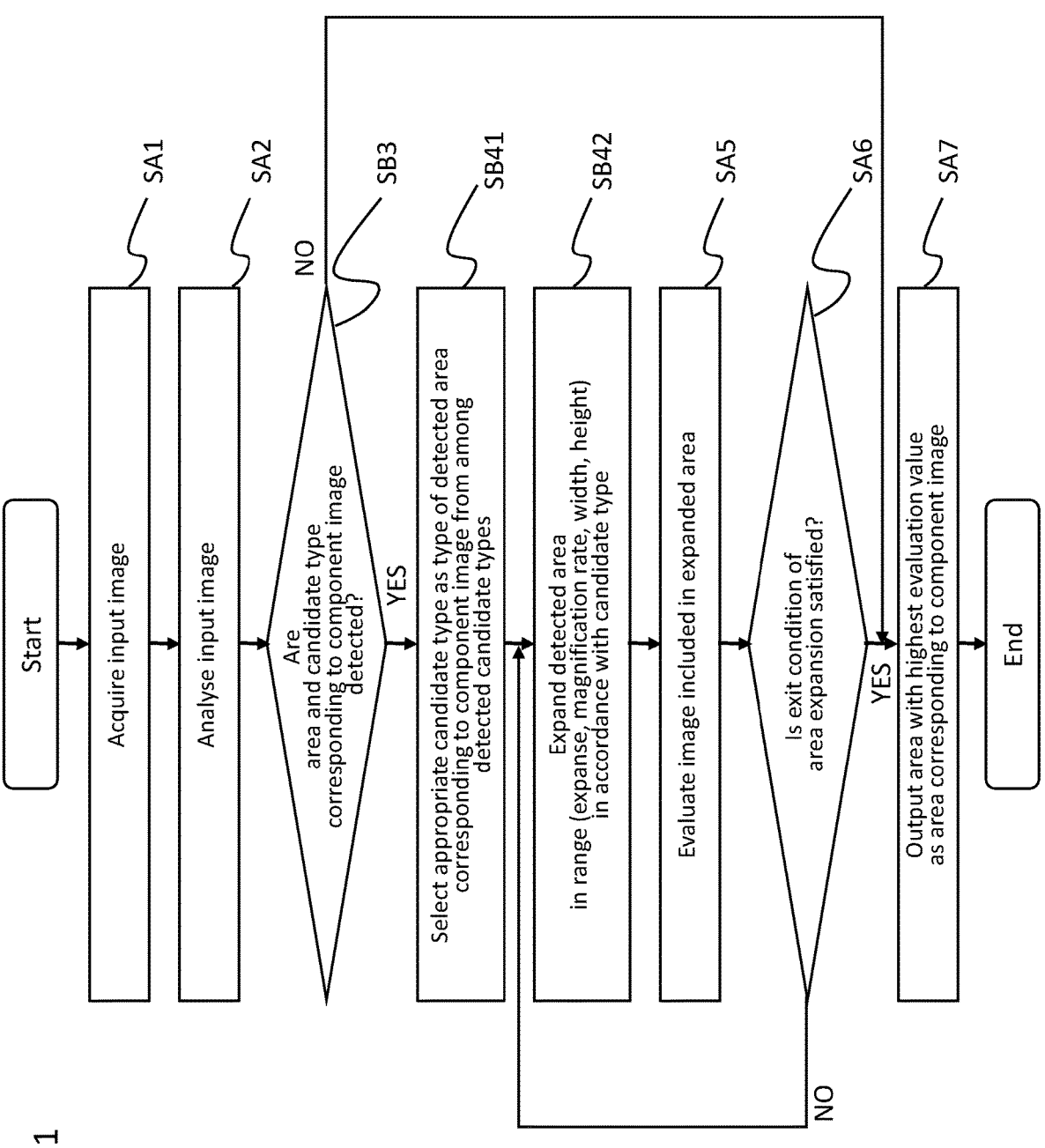
FIG. 11 is a flowchart showing a process of the image analysis device 1.

FIG. 11 is a flowchart showing a process of the image analysis device 1. The acquisition unit 101 acquires an input image read by a device such as a scanner or a camera, which is not shown in the figure (SA1). Next, the detection unit 102 analyses the input image obtained by the acquisition unit 101 (SA2) and detects an area and a candidate type corresponding to a component image constituting the input image (SB3). If no area and candidate type corresponding to a component image constituting the input image is detected (SA3: NO), the detection unit 102 terminates the image analysis process. If an area and a candidate type(corresponding to a component image constituting the input image are detected (SB3: YES), the type selection unit 107 selects, if there are more than one, an appropriate candidate type as the type of the detection area corresponding to the component image from among the candidate types detected by the detection unit 102 (SB41). The expansion unit 103 expands the area detected by the detection unit 102 in the range (expanse, magnification rate, width, height) in accordance with the candidate type selected by the type selection unit 107 (SB42). The evaluation unit 104 evaluates the image included in the area expanded by the expansion unit 103 on the basis of the rule according to the type (SA5). If an exit condition of the expansion is satisfied (SA6: YES), the image included in the expansion area with the highest evaluation value given by the evaluation unit 104 is outputted by the output unit 106 as an area corresponding to the component image (SA7). If no exit condition of the expansion is satisfied (SA6: NO), the expansion unit 103 expands the area that was expanded in SA4 again (SA4).

As described above, the expansion unit 103 can control the degradation of output accuracy in the area corresponding to the component image by changing the range to be applied to the expansion of the detection area for each candidate type of the detection area. Specifically, the expanded range is prevented from being too large or too small with respect to the component image.

In the present invention, the configuration elements of the embodiments may be arbitrarily modified or omitted within the scope of the invention.

DESCRIPTION OF SYMBOLS 1 image analysis device,
101 acquisition unit,
102 detection unit,
103 expansion unit,
104 evaluation unit,
105 rule DB,
106 output unit,
107 type selection unit,
11 CPU,
12 memory,
13 storage unit,
14 image acquisition unit,
15 display unit,
16 processing circuitry

The invention claimed is:

1. An image analysis device comprising processing circuitry configured
to acquire an input image;
to analyze the acquired input image and to detect an area corresponding to a component image constituting the input image and a type of the component image;
to expand the detected area one or more times until an exit condition is satisfied, the exit condition being one of an expansion area included in the expanded detection area including an area of a different type from the type of the detection area, a number of the expansions of the detection area reaching a maximum limit, the expansion area enclosing the outline of the component image;
to evaluate an image included in the expanded area on the basis of a rule according to the type; and

to output the image included in the expanded area as an image corresponding to the component image on the basis of an evaluation result obtained.

2. The image analysis device according to claim 1, wherein the detected area is expanded in a range according to the type of the detected area.

3. The image analysis device according to claim 1, wherein the detected area is expanded such that an outline of the component image is included in the area.

4. The image analysis device according to claim 1, wherein the detected area is expanded in a range such that the expanded area does not include an area of a different type from the type of the detected area.

5. The image analysis device according to claim 1, wherein when the detected type is a table, as a difference between the number of cells included in an area obtained as a result of an Nth expansion and the number of cells included in an area obtained as a result of an N+1th expansion is smaller, a higher evaluation value is given to the area obtained as a result of the Nth expansion.

6. The image analysis device according to claim 1, wherein when the detected type is a text, as a degree of coincidence between a character recognition result for an image included in an area obtained as a result of an Nth expansion and a character recognition result for an image included in an area obtained as a result of an N+1th expansion is higher, a higher evaluation value is given to the area obtained as a result of the Nth expansion.

7. The image analysis device according to claim 1, wherein when the detected type is a figure, as a blank area included in an area obtained as a result of the expansion is larger, a higher evaluation value is given to the obtained area.

8. A non-transitory storage medium storing an image analysis program to make a computer execute processes of:
acquiring an input image;
analyzing the acquired input image and detecting an area corresponding to a component image constituting the input image and a type of the component image;
expanding the detected area one or more times until an exit condition is satisfied, the exit condition being one of an expansion area included in the expanded detection area including an area of a different type from the type of the detection area, a number of the expansions of the detection area reaching a maximum limit, the expansion area enclosing the outline of the component image;
evaluating an image included in the expanded area on the basis of a rule according to the type; and
outputting the image included in the expanded area as an image corresponding to the component image on the basis of an evaluation result obtained.

9. An image analysis method comprising:
acquiring an input image;
analyzing the acquired input image and detecting an area corresponding to a component image constituting the input image and a type of the component image;
expanding the detected area one or more times until an exit condition is satisfied, the exit condition being one of an expansion area included in the expanded detection area including an area of a different type from the type of the detection area, a number of the expansions of the detection area reaching a maximum limit, the expansion area enclosing the outline of the component image;
evaluating an image included in the expanded area on the basis of a rule according to the type; and outputting the image included in the expanded area as an image corresponding to the component image on the basis of an evaluation result obtained.

* * * * *